United States Patent Office 3,325,444
Patented June 13, 1967

3,325,444
STABILIZED METHYL METHACRYLATE MONOMER AND POLYMER COMPOSITIONS CONTAINING A DITHIO PHOSPHINIC ACID OR A METAL SALT THEREOF
Richard James Best and Roy Charles Gordon, Kennebunk, Maine, assignors to American Cyanamid Company, Stamford, Conn., a corporation of Maine
No Drawing. Filed Mar. 16, 1965, Ser. No. 440,296
9 Claims. (Cl. 260—45.7)

ABSTRACT OF THE DISCLOSURE

Compositions of matter comprising monomeric methyl methacrylate and polymeric methyl methacrylate and plastic sheets of polymeric methyl methacrylate each containing small quantities of dicyclohexyl dithio phosphinic acid and certain salts thereof.

---

This application is a continuation-in-part of our application Ser. No. 381,910 filed July 10, 1964, now abandoned. This invention relates to a novel composition of matter comprising monomeric methyl methacrylate having dissolved therein, small but effective quantities of a compound selected from the group consisting of dicyclohexyl dithio phosphinic acid and a salt represented by the formula:

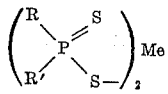

wherein R and R' are individually selected from the group consisting of alkyl of 2–18 carbons, lower cycloalkyl, monocyclic lower aralkyl and cyanoethyl; and Me is a cation of a metal selected from the group consisting of zinc, nickel, lead, cadmium, calcium, barium, magnesium, copper, tin and manganese. Still further, this invention relates to novel polymeric compositions comprising a polymer of methyl methacrylate containing small but effective quantities of the aforementioned acid or salts. Still further, this invention relates to molding compositions comprising a polymer of methyl methacrylate containing small but effective quantities of the aforementioned acid or salts. Still further, this invention relates to cast sheet of a polymer of methyl methacrylate containing small but effective quantities of the aforementioned acid or salts.

One of the objects of the present invention is to produce a polymerizable methyl methacrylate composition containing dissolved therein, small quantities of a compound selected from the group consisting of dicyclohexyl dithio phosphinic acid and a salt represented by the formula:

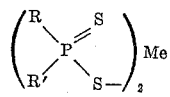

wherein R and R' are individually selected from the group consisting of alkyl of 2–18 carbons, lower cycloalkyl, monocyclic lower aralkyl and cyanoethyl; and Me is a cation of a metal selected from the group consisting of zinc, nickel, lead cadmium, calcium, barium, magnesium, copper, tin and manganese. A further object of the present invention is to polymerize methyl methacrylate in the presence of dissolved quantities of the aforementioned acid or salts so as to produce a polymeric material having surprising thermal stability characteristics as well as highly desirable ultraviolet light absorption properties. A further object of the present invention is to produce a composition of matter which can be polymerized to a thermally stable, non-yellowing, ultraviolet transmitting acrylic sheet. These and other objects of the present invention will be discussed in greater detail hereinbelow.

It is well known that methyl methacrylate is a liquid in the monomeric state and polymerizes by an exothermic reaction to form a solid polymer. Methyl methacrylate can also be copolymerized with a substantial plurality of other polymerizable monomers that have a boiling point of at least 60° C. to yield polymeric materials which are useful as molding and molded articles as well as cast sheet. Among the comonomers which may be used to copolymerize with methyl methacrylate are the lower alkyl acrylates such as methyl acrylate, ethyl acrylate, propyl acrylates, butyl acrylates, the lower alkyl methacrylate wherein the alkyl group has between two and four carbon atoms, the polymerizable styrenes such as styrene per se, the ring and side chain substituted alkyl and halo styrenes such as o-, m-, p-methyl styrenes, the 2,4-dimethyl styrene, 2,5-dimethyl styrene, the o-, m-, p-chloro styrenes, the α-methyl styrene, the α-chloro styrene, the cyclo alkyl esters of acrylic and methacrylic acid such as the cyclohexyl acrylate, the cyclohexyl methacrylate and the like, acrylic acid, methacrylic acid, acrylamide, methacrylamide, t-butyl methacrylamide and the like. These comonomers can be used in varying quantities and would be limited in amount only with respect to the compatibility of the copolymerizable monomer with the methyl methacrylate. However, for use in making cast sheet, it is generally preferred that there be at least 70% of methyl methacrylate present in the copolymerizable mix and the remaining percent of comonomer may be any one or more of monomers such as those outlined hereinabove. Homopolymeric methyl methacrylate is a preferred polymeric material to utilize particularly as cast sheet. Although many of these polymeric materials are thermoplastic, the use of small quantities of cross-linking agents enables the production of polymeric materials which appear to take on the characteristic of a thermoset material when the polymerization reaction has been completed. Among the cross-linking agents which may be used are the monomeric dimethacrylate esters of glycols having the formula:

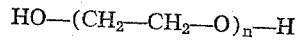

wherein $n$ is an integer or monomeric trimethacrylate esters of polyhydric alcohols such as the trimethacrylate esters or 1,1,1-trimethylol propane and the like. When these cross-linking agents are used, comparatively small amounts are sufficient to accomplish the cross-linking such as from about 2 to about 8% and preferably from about 4 to 6% by weight based on the total weight of monomers in the system.

The dicyclohexyl dithio phosphinic acid enjoys a greater measure of solubility in methyl methacrylate monomer than does any of the salts referred to hereinabove and described in greater detail hereinbelow. However, the amount of the dicyclohexyl dithio phosphinic acid used in the methyl methacrylate monomer, polymer or cast sheet can be held down to small but effective amounts since the advantages desired are achieved by use of such small amounts and no additional advantages are achieved by use of larger quantities. Ordinarily, one would use between about 0.02% and 0.4% by weight of this acid and preferably 0.05% by weight of the acid based on the total weight of the polymerizable or polymerized composition. This acid is disclosed in an article entitled, "The Preparation of Dithiophosphinates from Secondary Phosphines and Sulfur Under Alkaline Conditions," by M. M. Rauhut, H. A. Currier, and V. P. Wystrach in the Journal of Organic Chemistry, volume 26, page 5133, Dec. 19, 1961.

The salts which are used with the polymerizable methyl methacrylate monomer system are described as salts represented by the formula:

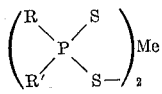

wherein R and R' are individually selected from the group consisting of alkyl of 2–18 carbons, lower cycloalkyl, monocyclic lower aralkyl and cyanoethyl; and Me is a cation of a metal selected from the group consisting of zinc, nickel, lead, cadmium, calcium, barium, magnesium, copper, tin and manganese. More specifically, these salts are zinc dicyclohexyl dithio phosphinate, nickel di-n-octyl dithio phosphinate, lead dicyclohexyl dithio phosphinate, zinc di-n-octyl dithio phosphinate, nickel di-n-butyl dithio phosphinate, nickel dicyclohexyl dithio phosphinate, nickel di-dodecyl dithio phosphinate, nickel-di-β-phenethyl dithio phosphinate, cadmium dicyclohexyl dithio phosphinate, copper (II) dicyclohexyl dithio phosphinate, manganese (II) dicyclohexyl dithio phosphinate, zinc diphenyl dithio phosphinate and the like. Many of these salts enjoy but limited solubility in methyl methacrylate monomer. As a consequence, the amount of the particular salt which is used with the methyl methacrylate monomer compositions should be limited to those amounts that the salt is soluble in the methyl methacrylate monomer. These amounts are comparatively small, but nevertheless are effective when added to the methyl methacrylate monomer composition and polymerized to yield a polymeric material having enhanced thermal stability and surprisingly effective ultraviolet light absorption properties. Ordinarily, one would use between about 0.02% and 0.4% by weight of these salts and preferably 0.05% by weight based on the total weight of the polymerizable or polymerized composition. When amounts significantly less than 0.02% are utilized, the effectiveness of the salt is diminished whereas when amounts significantly greater than 0.4% are utilized, dissolution problems may develop. Still further, since effective results are accomplished within the aforementioned amounts, nothing of significance will be gained by using larger quantities.

If desired, one may use with these salts, ultraviolet absorbers of the benzophenone class such as those disclosed in the U.S. Patent 2,777,828 or the U.S. Patents 2,818,400 and -401. These ultraviolet absorbers would be used in the conventional amounts such as those shown in the aforementioned patents.

In the polymerization of methyl methacrylate alone or with other monomeric polymerizable materials, one would make use of a polymerization catalyst of which a substantial plurality are well known in the art and are commercially available. These catalytic materials would be used in the conventional catalytic quantities. Among those which can be used are benzoyl peroxide, t-butyl hydroperoxide, di-t-butyl peroxide, cumene hydroperoxide, lauroyl peroxide, azobisisobutyronitrile and the like. The amount of catalyst as indicated hereinabove is conventional and is generally varied between about 0.01 and 1% by weight based on the weight of the polymerizable monomers and preferably about 0.03–0.05% by weight, same basis.

If desired, dyes, pigments, and fire retardant additives of the various types available, may be added to the polymerizable monomer prior to the polymerization process.

In order that the method for the preparation of the salts used in the compositions of the present invention may be completely understood, the following examples are set forth in which all parts are parts by weight unless otherwise indicated.

*Zinc dicyclohexyl dithio phosphinate*

A mixture of 86.5 parts sulfur, 500 parts of concentrated ammonium hydroxide, 500 parts water and 400 parts ethanol is stirred at room temperature while bubbling in helium. To this is added 244 parts of dicyclohexyl phosphine, dropwise over one hour. An exotherm raises the temperature to 45° C. Stirring is continued 30 minutes after addition without external heating; then the mixture is heated at 65° C. for one hour. It is cooled and filtered and to the filtrate is added 178.6 parts of ZnSO₄·7H₂O in 250 parts water. The white solid which forms is filtered, washed well with water and then acetone. The solid is recrystallized from 1:1 cyclohexane/xylene and filtered, giving 180 parts of zinc dicyclohexyl dithio phosphinate as a white crystalline product, melting point 215–216° C.

*Nickel di-n-butyl dithio phosphinate*

The filtered reaction mixture from 14.6 parts di-n-butyl phosphine, 7 parts sulfur and 100 parts of 14% ammonium hydroxide is combined with 12 parts of NiCl₂·6H₂O in 40 parts water. The resulting solution is extracted with ether, dried and evaporated under vacuum to obtain the violet, nickel di-n-butyl-dithio phosphinate, melting point 83–86° C. The solid is recrystallized from methanol, melting point 89–90° C.

*Nickel dicyclohexyl dithio phosphinate*

To a 75 parts aliquot (approximately equal to 0.066 mole) of the ammonium salt filtrate from Example 1, a solution of 8.4 parts (0.033 mole) of nickel (II) nitrate hexahydrate in 100 parts of water is added. A greenish-blue precipitate forms. Two hundred parts of chloroform are added with stirring and the bottom layer of chloroform and solid are separated from the water layer and evaporated on the steam bath to a medium-blue solid. The solid is extracted overnight, using benzene. The benzene extract is evaporated leaving the product as a crystalline solid, melting point 270–275° C.

*Nickel di-n-octyl dithio phosphinate*

The viscous reaction mixture from 10 parts di-n-octyl phosphine, 2.8 parts sulfur and 100 parts of 14% ammonium hydroxide is combined with 10 parts NiCl₂·6H₂O in 550 parts water. The resulting solution is extracted with ether, dried and evaporated under vacuum to obtain an oil which is dissolved in a 1:1½ warm butanol-methanol solution. After standing at 0° C. overnight, nickel di-n-octyl dithio phosphinate crystallizes, melting point 45–48° C. The solid is recrystallized from a benzene-methanol mixture, melting point 49–51° C.

*Lead dicyclohexyl dithio phosphinate*

Following the same procedure of Example 1, 235 parts of Pb(OAc)₂·3H₂O in 250 parts of water is added to the ammonium salt filtrate. The tan solid, which forms, is filtered and washed with water. The solid is recrystallized from benzene and filtered, giving lead dicyclohexyl dithio phosphinate, a crystalline solid, melting point 231–232° C.

The cupric, cadmium, manganese and stannous salts of dicyclohexyl dithio phosphinic acid were prepared in a manner analogous to that used for the preparation of the zinc salt thereof, except that in the place of the zinc sulfate there was substituted an equivalent amount of cupric chloride, cadmium chloride, manganese chloride and stannous chloride, respectively. Additionally, the zinc salts of the di-n-octyl dithio phosphinic acid and of di-t-octyl dithio phosphinic acid were prepared in a manner analogous to the procedure for preparing zinc dicyclohexyl dithio phosphinate hereinabove except that in the place of the dicyclohexyl phosphine there was substituted equivalent quantities of di-n-octyl phosphine and di-t-octyl phosphine, respectively.

In order that the concept of the present invention may be more completely understood, the following examples are set forth in which all parts are parts by weight unless otherwise indicated. These examples are set forth primarily for the purpose of illustration and any specific enumeration of detail contained therein should not be

EXAMPLE 1

Into a suitable mixing vessel there is introduced 96 parts of monomeric methyl methacrylate, 4 parts of 1,1,1-trimethylolpropane trimethacrylate, 0.03% of azobisisobutyronitrile and 0.50% by weight of zinc dicyclohexyl dithio phosphinate. The mixture is thoroughly stirred to accomplish the dissolution of the zinc salt into the monomeric mix whereupon the polymerizable composition is poured into a cell comprising two glass plates in superimposed relationship with a gasket edging to provide a barrier so as to keep the fluid in the cell. The cell is placed in an oven and held at about 130° F. for about 20 hours followed by 230° F. for 3 hours. A casting of excellent surface characteristics and faithfully conforming to the cell cavity is obtained. The cast sheet thus produced was cut and the samples are subjected to a plurality of physical tests including the thermal stability test and the weatherometer test. The thermal stability test is conducted by inserting the cast sheet into an oven heated to 356° F. and the sheet is allowed to remain in the oven for a two-hour period. Thereupon the sheet is removed and inspected for blisters. If no blisters are in evidence, the sheet is considered to have passed the test. This test is carried out in keeping with certain military specifications and the test is identified as MIL–P 21105–C Plastics, Sheet, Acrylic, Heat Resistant Utility Grade. The sheet produced by the above example, displayed no blisters after the two-hour heating period and was considered to have passed the test. A different sample of the cast sheet was subjected to the weatherometer test and after prolonged exposure, only comparatively slight yellowing of the sheet was in evidence.

EXAMPLE 2

Example 1 is repeated in substantially all details except that the methyl methacrylate monomer was 94 parts and in place of the 1,1,1-trimethylolpropane trimethacrylate there was substituted 6 parts of ethylene glycol dimethacrylate. The resulting casting had excellent surface characteristics and passed the thermal stability test and after prolonged exposure in the weatherometer, displayed only slight yellowing.

EXAMPLE 3

Example 1 is repeated in substantially all details except that the trimethacrylate was omitted and instead 100 parts of monomeric methyl methacrylate was used to form a homopolymer. The resulting casting had excellent surface characteristics and the sample passed the aforementioned thermal stability test. After prolonged exposure in the weatherometer, the sample showed only slight yellowing.

The weatherometer test is conducted substantially according to the artificial weathering method 6024 of Federal Standard 406, Oct. 5, 1961, also known as A.S.T.M. 1501–57T.

EXAMPLE 4

Example 1 is repeated in all essential details except that in the place of the 0.05% by weight of zinc dicyclohexyl dithio phosphinate there is substituted 0.05% by weight of dicyclohexyl dithio phosphinic acid. The procedure of Example 1 is carried out and the cast sheet thus produced passed the thermal stability test and the weatherometer test. A different sample containing 0.01% of the dicyclohexyl dithio phosphinic acid was used and again the cast sheet passed the thermal stability test. A still further sample is prepared using 0.02% of the dicyclohexyl dithio phosphinic acid. Again the cast sheet passed the stability test.

EXAMPLE 5

Into a suitable mixing vessel, there is introduced 97 parts of monomeric methyl methacrylate, 3 parts of ethyl acrylate, 0.03% of azobisiso-butyronitrile and 0.02% by weight of dicyclohexyl dithio phosphinic acid. The mixture is thoroughly stirred, poured in a cell and converted into a cast sheet by conventional procedures and is subjected to the thermal stability test which it passed and a different sample was subjected to the infrared heating test during which it required 63 seconds to blister under the infrared heating conditions.

EXAMPLE 6

Example 5 is repeated in all essential details except that the methyl methacrylate is present in an amount of 98 parts while the ethyl acrylate is present in an amount of 2 parts. The ultimate cast sheet passed the thermal stability test and lasted for 65 seconds in the infrared heating test.

EXAMPLE 7

Example 5 is repeated in all essential details except that the methyl methacrylate is present in an amount of 99 parts and the ethyl acrylate is present in an amount of about 1 part. The ultimate cast sheet passed the thermal stability test and endured for 75 seconds in the infrared heating test.

The infrared test for thermal stability indicates the relative thermal stability of plastics by measuring the time before blistering appears in each of several specimens exposed to infrared radiation. The apparatus employed is comprised of a straight, strip heater of low luminous emmissivity, laid horizontally. The specimen rest tables are located on each side of the strip heater and are vertically displaced $1'' \pm \frac{1}{16}''$ or $2'' \pm \frac{1}{16}''$ above the heater. The rest tables are covered with aluminum foil and are separated by a gap of approximately $1''$. The infrared strip heater is preheated for a minimum of 30 minutes. Specimens $1''$ wide of the various materials to be tested, including one control are taped together side by side for certainty of simultaneous starting of the test. The group of specimens is placed on the rest tables, bridging the gap at right angles and equidistant from the ends of the heater element. The time for each specimen to exhibit blistering is determined by the naked eye and is recorded by a stop watch.

What is claimed is:

1. A composition of matter comprising monomeric methyl methacrylate having dissolved therein from about 0.02% and 0.4%, by weight, based on the total weight of the methyl methacrylate of a compound selected from the group consisting of dicyclohexyl dithio phosphinic acid and a salt represented by the formula:

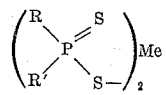

wherein R and R′ are individually selected from the group consisting of alkyl of 2–18 carbons, lower cycloalkyl and monocyclic lower aralkyl; and Me is a cation of a metal selected from the group consisting of zinc, nickel, lead, cadmium, copper and manganese.

2. A composition of matter comprising monomeric methyl methacrylate having dissolved therein from about 0.02% and 0.4%, by weight, based on the total weight of the methyl methacrylate of zinc dicyclohexyl dithio phosphinate.

3. A composition of matter comprising monomeric methyl methacrylate having dissolved therein from about 0.02% and 0.4%, by weight, based on the total weight of the methyl methacrylate of dicyclohexyl dithio phosphinic acid.

4. A composition of matter comprising a polymer of methyl methacrylate containing from about 0.02% and 0.4%, by weight, based on the total weight of the methyl methacrylate of a compound selected from the group consisting of dicyclohexyl dithio phosphinic acid and a salt represented by the formula:

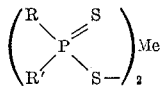

wherein R and R' are individually selected from the group consisting of alkyl of 2–18 carbons, lower cycloalkyl and monocyclic lower aralykyl; and Me is a cation of a metal selected from the group consisting of zinc, nickel, lead, cadmium, copper and manganese.

5. A composition of matter comprising a polymer of methyl methacrylate containing from about 0.02% and 0.4%, by weight, based on the total weight of the methyl methacrylate of zinc dicyclohexyl dithio phosphinate.

6. A composition of matter comprising a polymer of methyl methacrylate containing from about 0.02% and 0.4%, by weight, based on the total weight of the methyl methacrylate of dicyclohexyl dithio phosphinic acid.

7. A plastic sheet of a polymer of methyl methacrylate containing from about 0.02% and 0.4%, by weight, based on the total weight of the methyl methacrylate of a compound selected from the group consisting of dicyclohexyl dithio phosphinic acid and a salt represented by the formula:

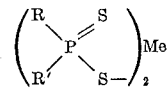

wherein R and R' are individually selected from the group consisting of alkyl of 2–18 carbons, lower cycloalkyl and monocyclic lower aralkyl; and Me is a cation of a metal selected from the group consisting of zinc, nickel, lead, cadmium, copper and manganese.

8. A plastic sheet of a polymer of methyl methacrylate containing from about 0.02% and 0.04%, by weight, based on the total weight of the methyl methacrylate of zinc dicyclohexyl dithio phosphinate.

9. A plastic sheet of a polymer of methyl methacrylate containing from about 0.02% and 0.4%, by weight, based on the total weight of the methyl methacrylate of dicyclohexyl dithio phosphinic acid.

References Cited

UNITED STATES PATENTS 2,727,067 12/1955 Craig et al. _____ 260—500
2,797,238 6/1957 Miller et al. _____ 260—500

DONALD E. CZAJA, *Primary Examiner.*

LEON J. BERCOVITZ, *Examiner.*

V. P. HOKE, G. W. RAUCHFUSS, JR.,
*Assistant Examiners.*